United States Patent [19]

Hovens

[11] 4,346,400
[45] Aug. 24, 1982

[54] MATRIX CIRCUITS

[75] Inventor: Paulus J. M. Hovens, Eindhoven, Netherlands

[73] Assignee: U.S. Philips Corporation, New York, N.Y.

[21] Appl. No.: 196,235

[22] Filed: Oct. 14, 1980

[30] Foreign Application Priority Data

Nov. 9, 1979 [NL] Netherlands .......................... 7908215

[51] Int. Cl.³ ............................................... H04N 9/52
[52] U.S. Cl. ................................................... 358/30
[58] Field of Search ....................... 358/21, 30, 27, 31; 328/156, 158

[56] References Cited

U.S. PATENT DOCUMENTS 3,719,772 3/1973 Roth ....................................... 358/30
3,953,884 4/1976 Isobe ..................................... 358/30

Primary Examiner—Michael A. Masinick
Attorney, Agent, or Firm—Thomas A. Briody; William J. Streeter; Laurence A. Wright

[57] ABSTRACT

Matrix circuit for obtaining a third color difference signal from first and second color difference signals demodulated in a color television receiver, a level compensation circuit rendering the levels of the three color difference signals independent from one another without the use of control loops and by using only two level detection circuits.

4 Claims, 3 Drawing Figures

MATRIX CIRCUITS

BACKGROUND OF THE INVENTION

Netherlands Patent Application No. 7807027 discloses a matrix circuit of the above-mentioned type in which in the difference producing circuit a level correction signal coming from the output of the relevant level detection circuit is subtracted from the relevant colour difference signal, the third colour difference signal being subtracted therefrom before it is applied to the input of the level detection circuit. The third colour difference signal is obtained from the difference between the first and the second colour difference signals, respectively, and the relevant level correcting signal, which causes two intercoupled control loops.

The invention has for its object to avoid this coupling of control loops.

SUMMARY OF THE INVENTION

According to the invention, a matrix circuit is characterized in that an input of the first and an input of the second detection circuit are connected to the relevant inputs of the matrix circuit for applying uncompensated colour difference signals to the inputs of the level detection circuits.

The invention is based on the recognition of the fact that it is not necessary to stabilize each one of the colour difference signals by means of a control loop when the level in the third colour difference signal varies as a result of the sign reversion during the composition thereof, but not into the opposite sense of the level of the first and the second colour difference signal, whereby excessive requirements would have to be imposed on the design of a further control loop in each colour channel, which control loop is customary for the video section of a colour television receiver.

The measure according to the invention renders the levels of the colour difference signals independent from one another while yet two level detection circuits and no coupled control loops are used.

BRIEF DESCRIPTION OF THE DRAWINGS

The invention will now be further explained by way of non-limitative example with reference to the accompanying drawing wherein.

DETAILED DESCRIPTION OF THE PREFERRED EMBODIMENTS

Figure 1:
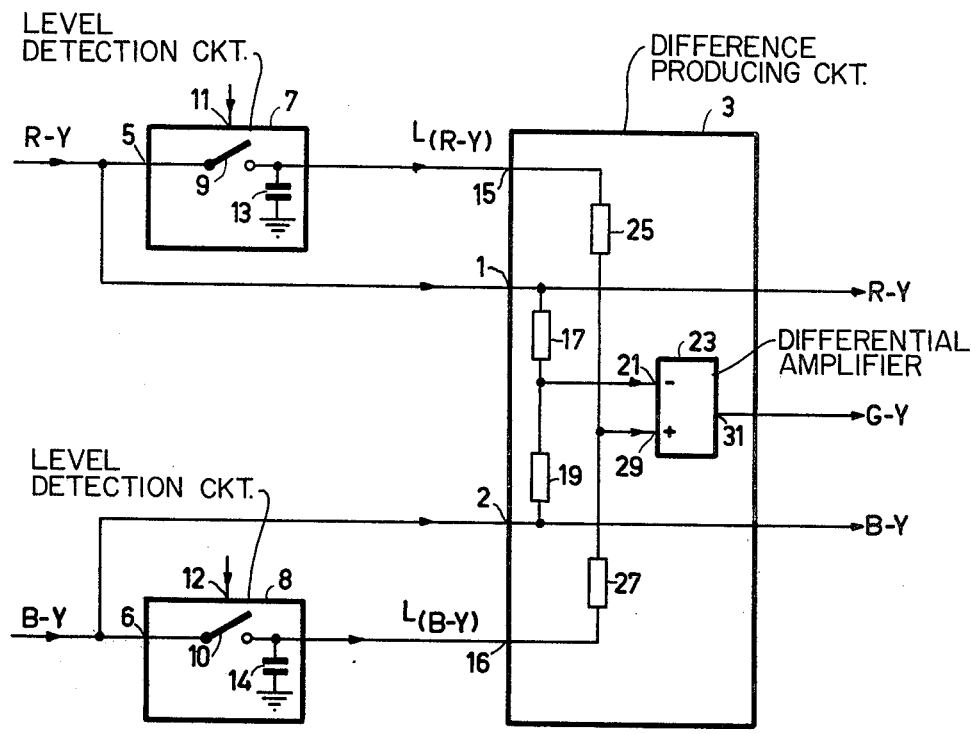
FIG. 1 illustrates by means of a block schematic circuit diagram a matrix circuit according to the invention.

In FIG. 1, a first and a second colour difference signal, respectively, (R-Y) and (B-Y), respectively, are applied to an input 1 and 2, respectively, of a difference producing circuit 3 and to an input 5 and 6, respectively, of a first level detection circuit 7 and a second level detection circuit 8, respectively.

The level detection circuits 7 and 8, respectively, which are connected to the inputs 5 and 6, respectively, and which at instants in the line fly-back at which a reference signal level is present in the colour difference signal are closed under the control of a signal applied to an input 11 and 12, respectively. Capacitors 13 and 14, respectively, connected to the switches 9 and 10, respectively, have consequently a voltage which corresponds to this reference signal level and which are denoted the first and second level correction signal $L_{(R-Y)}$ and $L_{(B-Y)}$, respectively, and which are applied to an input 15 and 16, respectively, of the difference producing circuit 3.

In the difference producing circuit 3 there is included, between the colour difference signals inputs 1 and 2, a resistance network 17, 19 from a tap of which a third colour difference signal having an uncorrected polarity—(G-Y) is obtained and applied to an inverting input 21 of a differential amplifier 23. Between the level correction signal inputs 15 and 16 of the difference reducing circuit a resistance network 25, 27 has been included, which has the same resistance value ratio as the network 17, 19. A tap of the resistance network 25, 27 is connected to a non-inverting input 29 of the differential amplifier 23.

The third colour difference signal (G-Y) in which any influence of any level variations of the first and the second colour difference signals have been suppressed as these possible variations then occur at the two inputs 21, 29 of the differential amplifier 23, is now obtained from an output 31 of the differential amplifier 23.

Preferably, the output circuit of the differential amplifier 23 is made to respond to supply voltage variations in the same way as the colour difference signal demodulators of the colour television receiver, in which the above-described matrix circuit is used, respond, so that less severe requirments may be imposed on the dimensioning of the remaining control loops used in the video section of the receiver than for the case that the level variations in the colour difference signal would not be compensated for, while yet no intercoupled control loops are used.

The above-described embodiment of the difference producing circuit 3 is the most advantageous embodiment for the majority of cases. A further possible embodiment is an embodiment in which no resistance network is provided between the inputs 1 and 2, a first differential amplifier is provided between the inputs 1 and 15, a second differential amplifier between the inputs 2 and 16, while the third colour difference signal is taken from a tap of a resistance network between the outputs of the first and second colour differential amplifiers. The difference producing circuit 3 may further be in the form of a resistance network between the inputs 1 and 2 from which the third colour difference signal is derived, no resistance network being provided between the inputs 15 and 16, but a first differential amplifier being provided between the inputs 1 and 15 from an output of which the first colour difference signal is taken, and a second differential amplifier being provided between the inputs 2 and 16, from an output of which the second colour difference signal is obtained.

Figure 2:
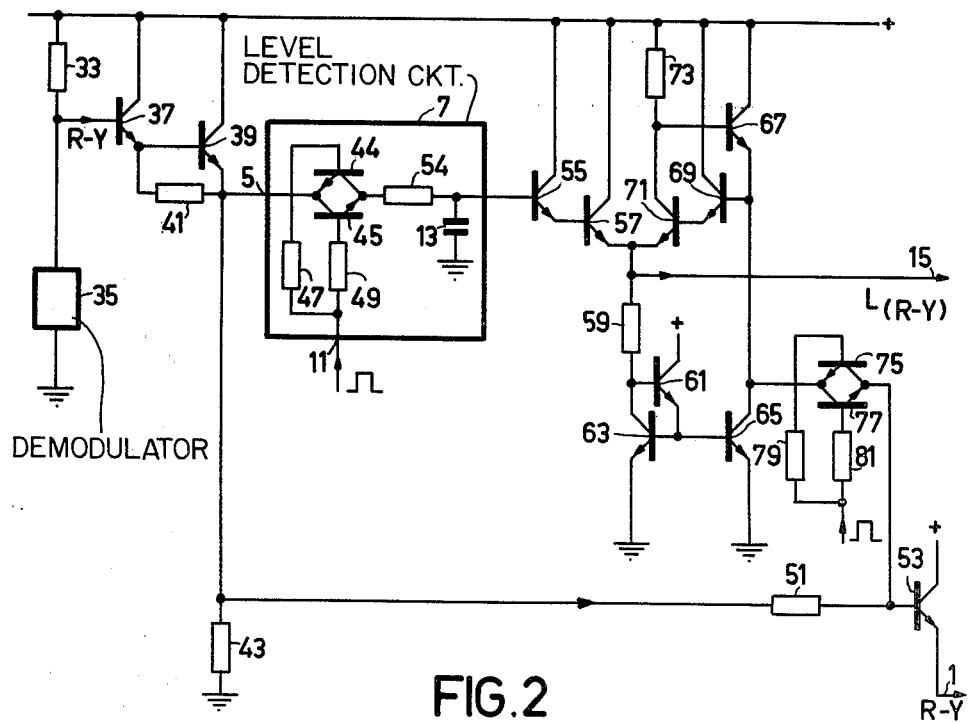
FIG. 2 illustrates by means of a circuit diagram a possible construction of a portion of a matrix circuit according to the invention which can produce signals for a difference producing circuit.

In FIG. 2 components corresponding to those used in FIG. 1 have been given the same reference numerals. From a load resistor 33 of a demodulator 35, a colour difference signal, here the (R-Y) signal, is obtained which is applied via an emitter follower pair 37 and 39 having a resistor 41 connected between their emitters and also having a load resistor 43 connected to input 5 of level detection circuit 7, whose electronic switch is constituted by two transistors 44, 45, which are arranged in anti-parallel and whose bases are connected to the switching input 11 via a resistor 47, 49.

Via a resistor 51 the colour difference signal is further applied to the base of an emitter follower 53, whose emitter is connected to the input 1 of the difference producing circuit 3.

The demodulator 35 is a conventional transistor multiplying circuit arranged as a so-called long tailed pair type.

The level correction signal is obtained from the capacitor 13, which is connected to the electronic switch 44, 45 via a resistor 54, and this level correction signal is applied to the input 15 of the difference producing circuit 3 via an emitter follower pair 55, 57 having a load resistor 59. Via a current-mirror circuit 61, 63, 65 the current through the resistor 59 is passed through a transistor 67, whose emitter is connected to the collector of the transistor 65 and to the base of a transistor 69, the emitter of this transistor 69 being connected to the base of a transistor 71, whose emitter is connected to the emitter of the transistor 57. The base of the transistor 67 is connected to the collector of the transistor 71 and, via a load resistor 73, to the supply voltage. This circuit passes the level correction signal occurring at the base of the transistor 55 also to the junction of the emitter of the transistor 67 with the base of the transistor 69 and the collector of the transistor 65. This junction constitutes an output having a very low impedance. Via an electronic switch having two transistors 75, 77, which are arranged in anti-parallel and which are each supplied with a switching signal via a base resistor 79, 81, this level is applied to the base of the transistor 53 during the occurrence of this switching signal. This switching signal occurs, for example, during a large portion of the line fly-back, so that in the colour difference signal which is connected to the input 1 of the difference producing circuit a noise-free clamping level is obtained, which corresponds to the original reference level of the colour difference signal.

Figure 3:
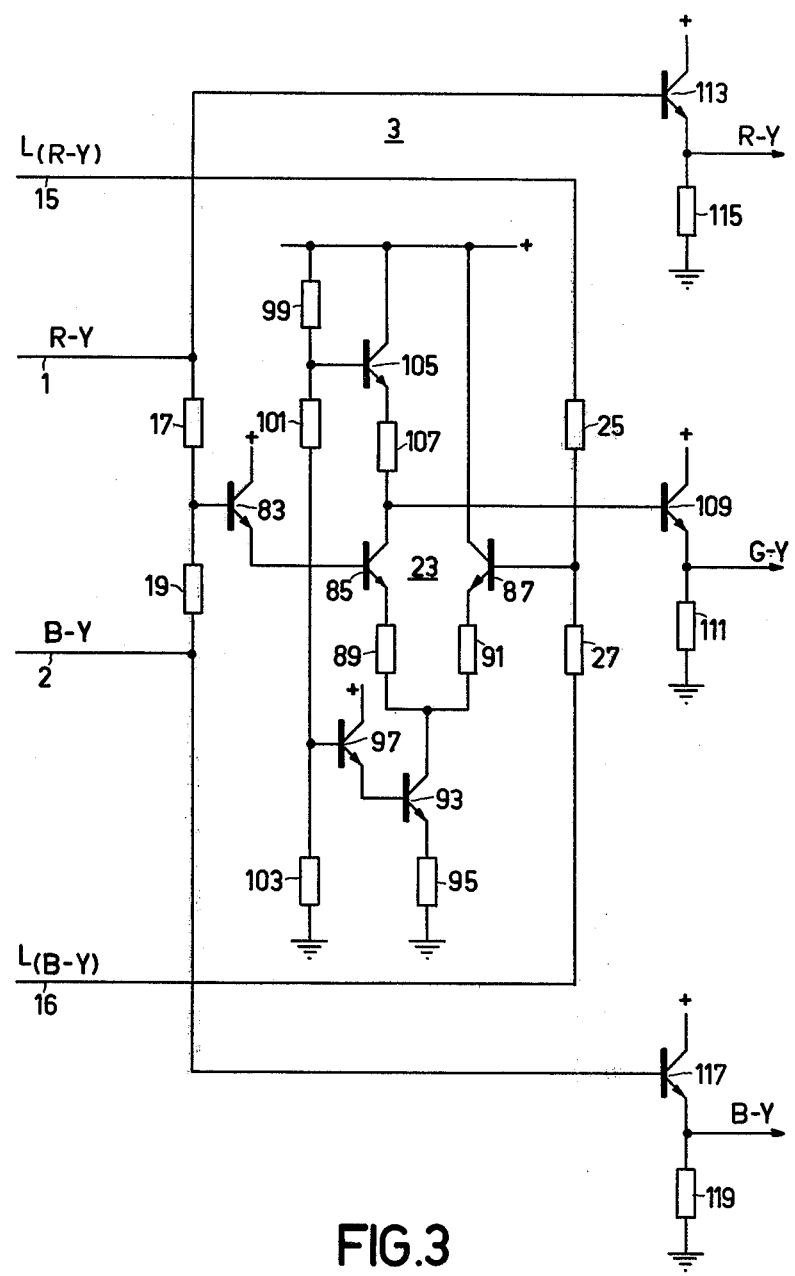
FIG. 3 illustrates by means of a circuit diagram a possible construction of a difference producing circuit for a matrix circuit according to the invention.

In FIG. 3 elements which correspond to those used in the preceding Figures have been given the same reference numerals. An emitter follower 83, which is connected to the tap of the resistors 17, 19 compensates in conjunction with the emitter follower 53 of FIG. 2 the level difference between the level correction signal at the input 15 and the colour difference signal at the base of the transistor 53 of FIG. 2. A similar circuit as shown in FIG. 2 is connected for the second colour difference signal and the second level correction signal to the inputs 2 and 16 of the difference producing circuit, so that the emitter follower 83 also compensates the level difference occurring in these signals.

The differential amplifier 23 is formed by two transistors 85, 87 whose emitters are interconnected and connected to the collector of a current source transistor 93. The base of the transistor 85 is controlled by the emitter of the transistor 83 and the base of the transistor 87 by the signal at the junction of the resistors 25, 27. The current source transistor 93 has an emitter resistor 95 and receives at its base a d.c. voltage from an emitter follower 97, whose base is connected to a tap of a voltage divider 99, 101, 103 between terminals of the supply voltage source. Another tap of that voltage divider supplies via an emitter follower the supply voltage for a load resistor 107 of the transistor 85 from whose collector the compensated G-Y signal is obtained which is applied to an emitter follower 109. The voltage divider 99, 101, 103 is dimensioned so that supply voltage variations at the collector of the transistor 85 produce the same variations as those at the inputs 1 and 2 which, in their turn, correspond with those at the junction of the resistor 33 and the demodulator 35 of FIG. 2.

The inputs 1 and 2 further apply the first (R-Y) and the second (B-Y) colour difference signal, respectively, to an emitter follower 113 and 117, respectively having emitter resistors 115 and 119 respectively.

The three colour difference signals produced by the emitter followers 113, 109, and 117, are independent from one another, as regards their level, and have a noise-free clamping level. The presence of the resistors 54 in the level detection circuits 7, 8 causes the level correction signals to be free from noise also during the occurrence of the switching signals at the inputs 11 and 12 of the level detection circuits, and consequently also the clamping levels in the colour difference signals are free from noise in the time intervals in which the switching signals are simultaneously present at the switches 75, 77 and the switches 43, 45.

What is claimed is:

1. A matrix circuit for obtaining a third color difference signal from first and second color difference signals to be applied to inputs thereof comprising: a difference producing circuit a first and a second level detection circuit for obtaining a first and a second level correcting signal to be applied to said difference producing circuit, said first and the second color difference signals also being applied to said difference producing circuit, and said difference producing circuit further comprising a circuit for compensating a mutual influencing of levels of said color difference signals, and wherein an input of the first and an input of the second level detection circuits are connected to the relevant inputs of the matrix circuit for applying uncompensated color difference signals to the inputs of the level detection circuits.

2. A matrix circuit as claimed in claim 1 comprising a first and second resistance network and wherein said difference producing circuit further comprises a differential amplifier, an input of said differential amplifier being coupled to a tap of said first resistance network to which output signals of the level detection circuit are applied, another input being coupled to a tap of said second resistance network to which input signals of said level detection circuits are applied.

3. A matrix circuit as claimed in claim 2, comprising a circuit for obtaining noise-free clamping levels in the output signals of said matrix circuit.

4. A matrix circuit as claimed in claim 3, wherein said level detection circuits comprises a resistor arranged in series with a switch and a capacitor for making the level correction signals noise-free during the feed-forward thereof.

* * * * *